Figure 1:
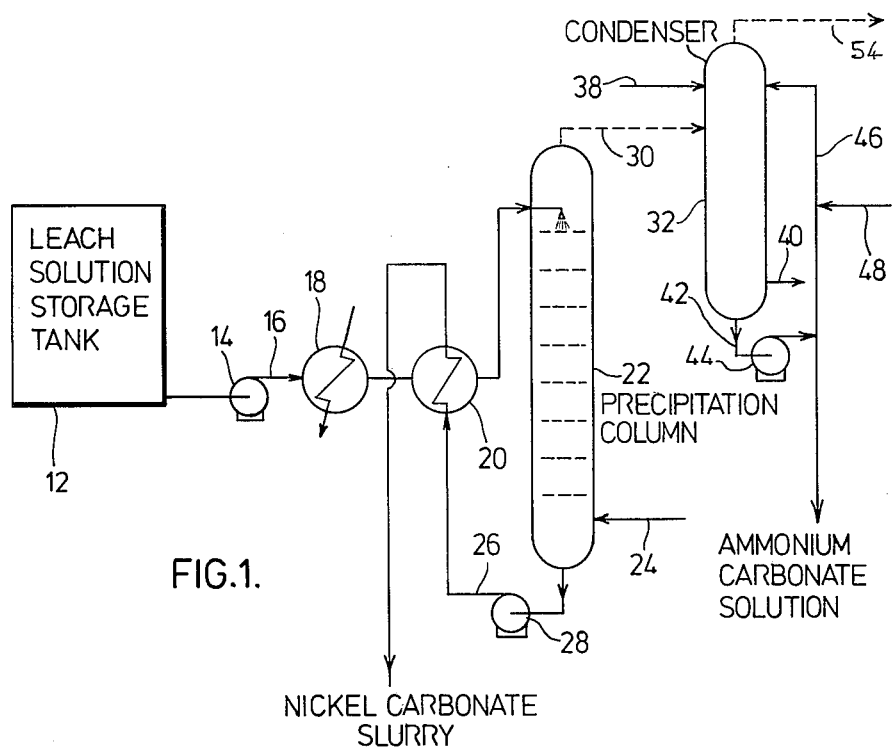

United States Patent [19]

Vydra et al.

[11] 4,329,320

[45] May 11, 1982

[54] METHOD AND TREATMENT OF A GASEOUS MIXTURE OF AMMONIA, CARBON DIOXIDE AND WATER VAPOR

[75] Inventors: Charles Vydra, Fort Saskatchewan; Bhupendra M. Parekh, Sherwood Park, both of Canada

[73] Assignee: Sherritt Gordon Mines Limited, Toronto, Canada

[21] Appl. No.: 863,635

[22] Filed: Dec. 22, 1977

Related U.S. Application Data

[63] Continuation-in-part of Ser. No. 663,039, Mar. 2, 1976, abandoned, which is a continuation-in-part of Ser. No. 479,931, Jun. 17, 1974, abandoned.

[30] Foreign Application Priority Data

Mar. 29, 1974 [CA] Canada ................................. 196406

[51] Int. Cl.$^3$ ..................... C01G 1/00; C01B 31/24; C01C 1/26
[52] U.S. Cl. ........................................ 423/1; 423/144; 423/234; 423/238; 423/419 R; 423/420
[58] Field of Search ............... 423/220, 234, 237, 238, 423/420, 419 R, 144, 1; 260/555 A; 55/23, 82

[56] References Cited

U.S. PATENT DOCUMENTS

| | | | |
|---|---|---|---|
| 1,915,723 | 6/1933 | Etienne et al. | 423/234 |
| 3,356,723 | 12/1967 | Kaasenbrood | 260/555 A |
| 3,607,938 | 9/1971 | Braun | 260/555A |
| 3,824,283 | 7/1974 | Harada et al. | 260/555 A |
| 3,867,442 | 2/1975 | Logemann | 260/555 A |
| 4,002,719 | 1/1977 | Tsao | 423/144 |

FOREIGN PATENT DOCUMENTS

| | | | |
|---|---|---|---|
| 14618 | of 1896 | United Kingdom | 423/220 |
| 9177 | of 1910 | United Kingdom | 423/420 |
| 275459 | 8/1927 | United Kingdom | 423/220 |

OTHER PUBLICATIONS

Thorne et al., "Inorganic Chemistry", Nordemaw Publishing Co., Inc., 1943, p. 810.

*Primary Examiner*—Earl C. Thomas
*Attorney, Agent, or Firm*—Robert F. Delbridge; Arne I. Fors

[57] ABSTRACT

A method of condensing a gaseous mixture of ammonia carbon dioxide gas and water vapor to produce an ammonium carbonate solution with minimum formation of ammonium carbamate includes passing the gaseous mixture into a condenser and cooling the condensing surface to cause the gaseous mixture to condense to form ammonium carbonate solution at a temperature at which formation of solid ammonium carbamate may occur. An aqueous liquid is discharged onto the condensing surface of the condenser, the liquid having an ammonia concentration below about 260 grams per liter to maintain the concentration of ammonia and carbon dioxide on the condensing surface below a concentration at which ammonium carbamate tends to form.

2 Claims, 2 Drawing Figures

METHOD AND TREATMENT OF A GASEOUS MIXTURE OF AMMONIA, CARBON DIOXIDE AND WATER VAPOR

This application is a continuation-in-part of application Ser. No. 663,039, filed Mar. 2, 1976, now abandoned, which was a continuation-in-part of application Ser. No. 479,931, filed June 17, 1974, now abandoned.

This invention relates to a method of condensing a gaseous mixture of ammonia gas, carbon dioxide gas and water vapour to produce an ammonium carbonate solution.

Such a method may be part of a hydrometallurgical process in which material containing a desired metal, such as nickel, is leached in an ammoniacal ammonium carbonate system to produce a leach liquor comprising dissolved metal values in ammoniacal ammonium carbonate solution. In such a process, the leach liquor may be heated to precipitate the metal as an insoluble carbonate, with ammonia gas and carbon dioxide gas as well as water vapour being driven off and collected as a gaseous mixture. The gaseous mixture is subsequently condensed in a condenser to form ammonium carbonate solution which can then be recycled to the leaching step.

Although the above mentioned procedure is probably the procedure in which the present invention is most useful, there are other instances where ammonia gas, carbon dioxide gas and water vapour are boiled off from a solution and are collected and condensed in a condenser to form ammonium carbonate solution which can be subsequently re-used. For example, an ammoniacal leach liquor may contain dissolved copper values as well as values of another metal, with the copper being removed from the leach liquor by boiling off free ammonia to cause precipitation of copper as copper sulphide. Carbon dioxide is frequently added in this step to precipitate any calcium present as calcium carbonate, with the result that excess carbon dixode gas is boiled off with the ammonia gas and with water vapour also being boiled off. As another example ammoniacal ammonium carbonate leach liquor containing dissolved cobalt may be boiled to precipitate cobalt as cobalt oxide, again with ammonia gas, carbon dioxide gas and water vapour being driven off. As will be apparent to a person skilled in the art, this list of possible uses of the invention is not exhaustive, the invention being applicable to any situation where a gaseous mixture of the gas, carbon dioxide gas and water vapour is to be condensed to produce an ammonium carbonate solution.

In such a condensation step, the temperature at which the condensation occurs is desirably less than 60° C., not only because such a temperature is usually consistent with other steps in the process in which the condensation step is used, but also because more satisfactory condensation to ammonium carbonate occurs. Higher temperatures than 60° C. are thus not only undesirable but will also lead to unnecessary higher energy requirements.

In condensers normally used for such a condensation step, the gaseous mixture impinges on a cooled condensing surface, which may for example be formed by the exterior surfaces of tubes through which cooling liquid passes. The condensation reaction required is as follows:

$$2NH_3 + CO_2 + H_2O \rightarrow (NH_4)_2CO_3$$

Where insufficient ammonia is present, some ammonium bicarbonate may be formed as follows:

$$NH_3 + CO_2 + H_2O \rightarrow NH_4HCO_3$$

The presence of some ammonium bicarbonate in the ammonium carbonate solution does not usually present any significant problem. However, if sufficient water is not present, ammonium carbamate may be formed, as follows:

$$2NH_3 + CO_2 \rightarrow NH_4CO_2NH_2$$

Besides the fact that the presence of ammonium carbonate in the ammonium carbonate solution is undesirable, a further problem arises because, when the condensation temperature is in the region of 60° C., solid ammonium carbamate may crystallize out on the condensing surface. This means that after a period of time, the condenser will have to be shut down so that the solid ammonium carbamate can be removed from the condensing surface.

It is therefore an object of the present invention to provide a method of condensing a gaseous mixture of ammonia gas, carbon dioxide gas and water vapour to produce ammonium carbonate solution in which the problem of formation of solid ammonium carbamate on the condensing surface is reduced or eliminated.

According to the invention, a liquid is discharged onto the condensing surface to maintain the concentration of ammonia and carbon dioxide on their condensing surface below a concentration at which ammonium carbamate tends to form. More particularly, it has been found that the liquid may contain ammonia so long as the ammonia concentration does not exceed about 260 grams per liter, and preferably is less than about 220 grams per liter.

The liquid may be water, a mixture of ammonia and water, or a mixture of ammonia, carbon dioxide and water. In the last mentioned case, the liquid may advantageously comprise ammonium carbonate solution produced in the condenser. If necessary, the ammonium carbonate solution from the condenser may be diluted to a desired ammonia concentration for recycle to the condensing surface in the condenser. Normally, in a hydrometallurgical process of the kind previously described, only a portion of the ammonium carbonate solution produced in the condenser will be recycled to the condensing surface, and the remaining portion of the ammonium carbonate solution is utilized for recycle to another step, such as the leaching step, of the hydrometallurgical process concerned.

Figure 2:
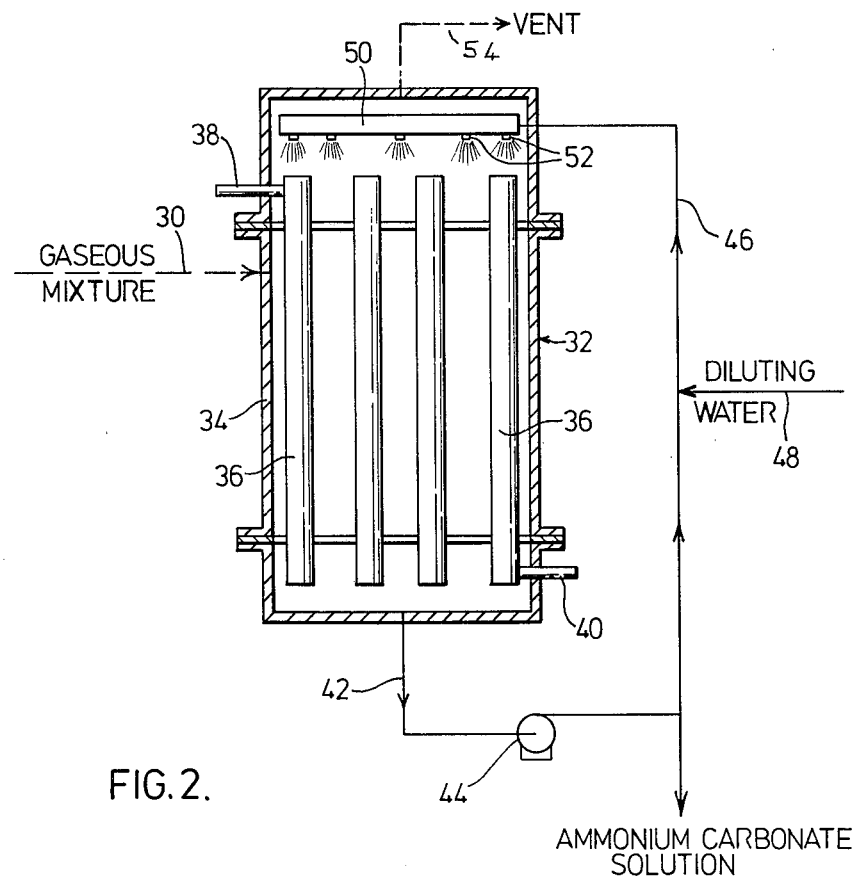

One embodiment of the present invention will now be described, by way of example, with reference to the accompanying drawings, in which:

FIG. 1 is a schematic flow diagram of part of a nickel recovery circuit following ammoniacal ammonium carbonate leaching of a nickel containing material; and FIG. 2 is a schematic front view, partly in section, of the condenser shown in FIG. 1.

Referring first to FIG. 1, leach liquor comprising dissolved nickel values and ammoniacal ammonium carbonate solution is contained in a storage tank 12. In a typical case, the solution may contain about 10 gpl nickel, 70 gpl ammonia and 55 gpl carbon dioxide. A person skilled in the art will readily understand that the leach liquor is obtained as a result of leaching a nickel containing ore in ammoniacal ammonium carbonate solution, with the undissolved residue having been removed in a conventional liquid-solids separation step. Further, the leach liquor in storage tank 12 may already have been subjected to one or more purification steps to remove various contaminants. However, as is well known, the leach liquor at this stage will still contain certain dissolved contaminants which have to be removed before nickel of sufficiently high purity can be recovered.

One known manner of eliminating some of the contaminants is to boil the nickel containing ammoniacal ammonium carbonate solution to precipitate the nickel as basic nickel carbonate, with subsequent evolution of ammonia gas, carbon dioxide gas and water vapour. The resultant slurry of basic nickel carbonate is then treated elsewhere in known manner for recovery of nickel, for example as described in U.S. Pat. No. 3,640,706, issued Feb. 8, 1972 to Zubryckyj et al. In this embodiment, the evolved gaseous mixture is condensed in accordance with the invention to produce ammonium carbonate solution which can be re-used in the leach step.

Accordingly, the nickel containing ammoniacal ammonium carbonate leach liquor in the storage tank 12 is pumped along line 16 by pump 14 through an auxiliary preheater 18 to which heat is supplied by steam. The solution then passes through a further preheater 20 which in this case is heated by basic nickel carbonate slurry, as will be described in more detail later. The heated solution then passes to a precipitation column 22 in which the solution is sprayed in a downwards direction from an upper part of the column. Steam is supplied to the bottom of the column 22 through line 24, and flows up the column 22 in the opposite direction to the sprayed solution, with the result that ammonia gas, carbon dioxide gas and water vapour are driven off and basic nickel carbonate is precipitated. The resultant basic nickel carbonate slurry leaves the bottom of the column 22 along line 26 and is pumped by pump 28 through the previously mentioned solution preheater 20, and from there to further conventional steps in the nickel recovery process, such as described in the above mentioned U.S. Pat. No. 3,640,706. At this stage, the slurry in line 26 may typically contain about 18 gpl basic nickel carbonate, 1.5 gpl ammonia, 0.6 gpl carbon dioxide and 0.03 gpl dissolved nickel.

The gaseous mixture evolved in the precipitation column 22 is passed from the top of the column 22 along a line 30 to a condenser 12. The gaseous mixture may typically contain 30% by volume ammonia, 9% by volume carbon dioxide and 61% by volume water vapour at a temperature of about 90° C. and a pressure of about 120 kPa. Condenser 32 is shown more clearly in FIG. 2, and comprises a housing 34 containing a series of interconnected tubes 36 mounted in the housing 34 in a vertical position. Cooling water is passed sequentially through the tubes 36 from an inlet 38 to an outlet 40, and the external surfaces of the tubes 36 form a condensing surface for the gaseous mixture entering the housing 34 through the line 30.

Thus, the gaseous mixture of ammonia gas, carbon dioxide gas and water vapour entering the housing 34 through line 30 impinges on the cooled condensing surface formed by the exterior surfaces of the tubes 36 and condenses to form ammonium carbonate solution, which as explained previously may contain a small amount of dissolved ammonium bicarbonate. More precisely, the water vapour condenses to liquid form, and the ammonia gas and carbon dioxide gas are absorbed by the water, but for simplicity and convenience this will be referred to as a condensation step.

The ammonium carbonate solution then runs down the exterior surfaces of the tubes 36 to the bottom of the housing 34, from which it leaves through line 42 and pump 44. Typically, the ammonium carbonate solution in line 42 may contain about 210 gpl ammonia and 150 gpl carbon dioxide. In accordance with the invention, a portion of the ammonium carbonate solution from the condenser 32 is recycled to the condenser 32 through line 46, with the solution in line 46 being diluted by water supplied through line 48. The diluted ammonium carbonate solution is supplied through line 46 to a spray header 50 at the upper part of the interior of the housing 34, the spray header 50 having a series of downwardly extending spray nozzles 52 through which the diluted solution is sprayed onto the exterior surfaces of the tubes 36, that is to say onto the condensing surface of the condenser 32. A small proportion of the gases in the condenser 32 are not condensed, and are removed through a vent 54.

Usually the temperature of the gaseous mixture entering the condenser 32 through line 30 will be in the range of from about 85° C. to about 200° C., and the temperature of the ammonium carbonate solution leaving the condenser 32 through line 42 will usually be in the range of from about 30° C. to about 60° C. The cooling water entering through inlet 38 is usually at a temperature in the range of from about 20° C. to about 30° C. and the water exiting through outlet 40 is usually at a temperature in the range of from about 30° C. to about 40° C. The pressure in the condenser 32 may range from a pressure below atmospheric pressure to a pressure up to about 3000 kPa.

The relative amounts of ammonia gas, carbon dioxide gas and water vapour in the gaseous mixture supplied to the condenser 32 through line 30 are normally such that condensation primarily produces ammonium carbonate solution, with a small amount of ammonium bicarbonate also being produced. If liquid was not sprayed from the nozzles 52, there could well be a relative lack of water on some portions of the condensing surface such that ammonium carbamate is formed, and such ammonium carbamate would be likely to crystallize out on the condensing surface, particularly if the temperature of the condensing surface is approaching 60° C. The spray of liquid from the nozzles 52 in accordance with the invention not only supplies water to substantially prevent a relative lack of water at any place on the exterior of the tubes 36 thereby reducing the likelihood of ammonium carbamate being formed, but also tends to wash off any ammonium carbamate crystals from the exterior surfaces of the tubes 36 which may nevertheless have been formed thereon.

Recycle of product ammonium carbonate solution, diluted if necessary, to the spray nozzles 52 has been found to successively prevent any significant formation of solid ammonium carbamate on the exterior surfaces of the tubes 32, so long as the ammonium concentration of the solution sprayed from the spray nozzles 52 is less than about 260 gpl, and preferably less than about 220 gpl. The spraying of such a solution from the nozzles 52 accordingly does not unduly dilute the product ammonium carbonate solution obtained from the bottom of the condenser 32 through line 42. Any undue dilution of product ammonium carbonate solution in this step will of course mean that the solution would very likely have to be reconcentrated before use elsewhere in the process of which the condensation step is apart, and such a concentration step would require further equipment and result in additional cost.

If desired, the condenser 32 may be modified so that the cooling tubes 36 are horizontal, but the arrangement shown in FIG. 2 where the cooling tubes 36 are vertical is preferred.

From the above description of a preferred embodiment of the invention, it will be readily understood that the present invention enables a gaseous mixture of ammonia gas, carbon dioxide gas and water vapour to be condensed to ammonium carbonate solution not only in such a manner that formation of solid ammonium carbamate in the condenser is effectively avoided, but also in a manner which is compatible with the required condensation step in hydrometallurgical processes of the kind concerned.

Various other embodiments within the scope of the invention will be clearly apparent to a person skilled in the art, the scope of the invention being defined in the appended claims.

What we claim as new and desire to protect by Letters Patent of the United States is:

1. A method of treating ammoniacal ammonium carbonate solution containing dissolved metal values, comprising heating said solution to precipitate an insoluble compound of said metal and drive off a gaseous mixture comprising ammonia gas, carbon dioxide gas and water vapour, passing the gaseous mixture into a condenser having a condensing surface therein, cooling the condensing surface to cause the gaseous mixture to condense on said surface to form ammonium carbonate solution at a temperature at which formation of solid ammonium carbamate may occur, discharging onto the condensing surface a liquid having an ammonia concentration below about 260 grams per liter to maintain the concentration of ammonia and carbon dioxide on said condensing surface below a concentration at which ammonium carbamate tends to form, recovering the condensed ammonium carbonate solution from the condenser and recovering said insoluble compound of said metal from said heating step, said liquid discharged onto the condensing surface comprising ammonium carbonate solution recovered from the condenser.

2. A method according to claim 1 wherein said ammonium carbonate solution recovered from the condenser is diluted before discharge onto the condensing surface.

* * * * *